Patented Dec. 22, 1936

2,065,395

UNITED STATES PATENT OFFICE 2,065,395

FRACTURED WOOD FIBER PRODUCT

George A. Richter, Berlin, N. H., assignor to Brown Company, Berlin, N. H., a corporation of Maine No Drawing. Application August 27, 1935, Serial No. 38,062

4 Claims. (Cl. 92—3)

This invention relates to a fractured wood fiber product such as is more particularly useful for conversion into various cellulose derivatives including cellulose xanthate, cellulose nitrate, and cellulose acetate, and as can be used advantageously for various other purposes, for instance, as absorbent or filtering medium and as filler in papers, molded plastics, and other products. The wood fiber product of the present invention is characterized by its high chemical reactivity and its low solution viscosity and is hence admirably adapted for conversion into the low viscosity nitrocelluloses required in the nitrocellulose lacquer industry. Because of its high chemical reactivity and low solution viscosity, it also lends itself nicely to a one-step xanthation to form solutions of cellulose xanthate or viscose syrup according to the practices disclosed in my applications Serial Nos. 679,585 and 38,261, filed July 8, 1933 and August 28, 1935, respectively.

The fractured wood fiber product of the present invention is derived from sawdust or equivalent comminuted wood as the parent material and is prepared by subjecting the sawdust, preferably after particle size classification, to chemical purifying treatments analogous to those sometimes employed in the manufacture of chemical wood pulp. The chemical purifying treatments are performed under conditions designed to rid the sawdust substantially completely of its ligneous and resinous components and to liberate the ultimate fractured wood fibers or fiber particles in a purified state and possessed of low solution viscosity, namely, a solution viscosity of not greater than 2 C. G. S. units. Aside from the fact that the present invention makes available for conversion into a valuable cellulose the waste or by-product resulting in abundance in all lumber-mills, it permits of the ready realization of such valuable cellulose from all kinds of wood including the various hardwoods and the highly resinous woods, such as southern pine, having a resin content as high as 4% or even higher, which woods cannot be resolved by ordinary chemical pulping practices into wood pulps suitable for good grades of paper or adapted for satisfactory conversion into cellulose derivatives. It is evidently the case that when wood is acted upon in the form of chips, as in ordinary chemical pulping, by fiber-liberating reagents, the extraction of the ligneous and resinous components, especially in the case of hardwoods or highly resinous woods, is decidedly inferior to that had when sawdust of the same wood is extracted under similar conditions with the same fiber-liberating reagents. Moreover, in the case of sawdust, the fiber-liberating reagents evidently modify or activate the ultimate cellulose or fiber wall to a greater degree, as the fractured wood fiber product resulting from the treatment of the sawdust of a particular wood is of higher chemical reactivity and of decided lower solution viscosity than the wood pulp resulting from a similar treatment of the chips of the same wood.

There are various processes by which the product of the present invention may be prepared; and, without limiting myself thereto, I shall now indicate typical processes which may be practiced to good advantage. Thus, the sawdust of spruce or other coniferous wood is preferably initially screened to eliminate wood particles of a size coarser than 10-mesh. The screened sawdust may then be delivered into an acid pulp digester in amount to fill the digester to the same level as that customary when pulping wood chips. To the digester may then be added a sulphite cooking liquor, preferably one whose free $SO_2$ content is much greater than its combined $SO_2$ content. For instance, the cooking liquor may be one containing about 5% free $SO_2$ and about 0.5% combined $SO_2$, the expression "free $SO_2$" connoting the sulphur dioxide in the liquor capable of being neutralized by caustic soda or equivalent alkali. Such an acid sulphite liquor may be added to the digester in volume to produce a raw sawdust suspension whose combined $SO_2$ content, based on dry wood, is about 4%, as this amount of liquor makes for a flowable suspension containing adequate combined $SO_2$ for extracting or dissolving most of the ligneous content of the sawdust. Once the digester is charged with the sawdust and cooking liquor, it may be closed and its contents heated to an appropriately elevated temperature, preferably one attainable under superatmospheric pressure. Thus, live steam may be introduced into the digester or into its circulation system to cause substantially uniform heating of its contents to a temperature of, say, about 285° C., which temperature may be reached gradually in, say, about two hours and then maintained for, say, about four hours more. In order to effect the desired mixing and substantially uniform heating of the digester contents, the digester may be equipped with a circulating pipe line extending from its bottom to its top and with a suitable pump which effects the desired positive circulation through such pipe line. In such case, the steam employed for heating the digester contents may be introduced into the circulating line rather than into the digester proper so as to effect the desired heating of small portions or increments of the sawdust suspension as it is being progressively circulated and thereby to realize a substantially uniform and constant heating of the digester contents as a whole. The superatmospheric pressure under which digestion of the sawdust suspension takes place, which pressure arises from both the steam and free sulphur dioxide, may be kept at about 75 to 90 pounds, preferably 90 pounds, the relief valve in the digester being opened only to relieve excess pressure such as may build up toward the end of the cooking period. At the end of the cooking period, the vapors and gases may be partially released from the digester and the digester contents blown into a suitable pit or blow-tank. When the digester stock is examined, it is found that the sawdust particles have not as yet been resolved into the ultimate fiber fragments or fractured wood fibers but that the fiber fragments are still bound together and have the same appearance as the small fiber bundles constituting the original or raw sawdust.

The digested sawdust stock may be washed free of the spent acid sulphite liquor associated therewith, as in a rotary washer, with negligible loss of stock in the wash water. The washed stock has a lignin content of less than 3%, a pentosan content of less than 3%, and a solution viscosity of less than 2. It might be noted that the solution viscosity of such stock is vastly lower than that of the ordinary sulphite pulp whose solution viscosity usually ranges from about 25 to 100.

The washed stock is then preferably further purified by suitable chemical treatment designed to rid it of ligneous and resinous residues as well as to lower its solution viscosity and thus to improve it for conversion into cellulose derivatives or for use as a filler in paper or other products wherein substantial stability, especially color stability, is desired. A typical purifying treatment may involve an initial chlorination of the washed digested stock, for instance, chlorination of a 4% stock suspension at about 50° C. with about 2% to 4% chlorine, based on the dry weight of stock. When chlorination is thus conducted at elevated temperature, the chlorine is substantially consumed by reaction with the ligneous residues in about one hour. The stock may be washed at the end of the chlorinating period and then digested as, say, an 8% stock suspension for about 2 to 4 hours at 100° C. in an alkaline liquor containing, say, about 10% caustic soda, based on the weight of dry stock. The alkali-refined stock is again washed; and, at this stage, it is of light color, has a lignin content of less than 2%, a pentosan content of less than 2%, a resin content of less than 0.2%, and a solution viscosity less than 2.0, this latter value sometimes being as low as 0.2. In such purified but unbleached condition, the stock is quite suitable for conversion into cellulose derivatives, although it may be desirable to subject it to a partial or full bleaching treatment. For instance, it may be treated as an 8% stock suspension for about six hours at 30° C. in a bleach liquor containing, say, about 1% to 2% sodium or calcium base hypochlorite bleach, the liquor preferably containing sufficient caustic soda or other alkali to remain distinctly alkaline throughout the bleaching operation. The bleached stock may then be washed, suitably anti-chlored, as with sulphurous acid or sodium bisulphite solution, and finally again washed.

The complete process hereinbefore described tends to resolve the fiber fragment bundles constituting the original or raw sawdust stock into the ultimate fiber fragments, but if such resolution of the raw sawdust particles into their fiber fragments is incomplete, the chemically finished stock suspension may be run through a blunt-bladed jordan, kollergang, high speed agitator or other suitable instrumentality capable of shearing or rubbing apart the loosely aggregated fiber fragments. The finished product containing the substantially individualized fiber fragments may then be sheeted on a papermaking machine into a paper product which, although lacking in the strength and toughness qualities of ordinary papers, may be economically shipped in such form to xanthating, nitrating or acetylating mills. The paper may, if desired, be converted as such into cellulose nitrate or other cellulose derivatives; or it may be shredded preparatory to such conversion. In some instances, rather than treating the chemically finished stock in wet or suspension form to complete the resolution into the ultimate fiber fragments, the stock may be dewatered, dried and put through a hammer mill, ball mill, or other such instrumentality in substantially dry condition so as to cleave apart residual loosely aggregated fiber fragments and to produce a bulky or voluminous mass of substantially individualized fiber fragments.

The chemical treatments hereinbefore described are subject to considerable variation; and, so too, the comminuted wood to be processed may be other than coniferous. For instance, I may start with the sawdust of southern pine having a resin content of about 4%. The sawdust may, after initial particle size classification, be digested in a dilute solution of mineral acid at appropriate temperature and for an appropriate period of time. The initial digestion or chemical treatment of the raw sawdust may be effected as a 6% to 8% stock suspension in a 0.2% solution of sulphuric acid at 100° C. for about 2 to 8 hours. Such a digestion may be performed in a series of open tanks, the stock overflowing from one tank to another and finally into a washer which frees the digested stock of the spent digesting reagent associated therewith.

The washed digested stock may then be further purified by re-digestion in an alkaline liquor at temperatures attainable over superatmospheric pressure. Thus, re-digestion of the stock may be performed in an alkaline liquor of a concentration of one pound of alkali per cubic foot, calculated as $Na_2O$ but present in the form of 70% caustic soda and 30% sodium sulphide, the liquor being admixed with the stock in amount to afford 0.15 pound of alkali calculated as $Na_2O$, based on the dry weight of the original sawdust. Re-digestion of the stock may be carried on in such an alkaline liquor at a temperature of about 335° F. for about two to three hours, heating and circulation of the stock suspension preferably being effected as in the example of acid sulphite cooking hereinbefore described. The resulting stock may be readily bleached to whiteness, if desired. It is possessed of characteristics generally similar to those of the stock prepared according to the procedure already described, having a lignin content of less than 2%, a pentosan content of less than 1%, a resin content of less than 0.2%, and a solution viscosity of less than 1. If desired, it may be subjected to further processing, as hereinbefore described.

In lieu of using dilute sulphuric acid in the initial chemical treatment of the raw sawdust stock, dilute solutions of other mineral acids, such as hydrochloric and nitric, may serve as the digesting reagents under appropriate conditions of concentration, temperature, and time. Again, alkaline reagents may be employed for the initial chemical treatment of the raw sawdust stock and such initial treatment may be combined with subsequent acid and/or alkaline purifying treatments performed under conditions to conduce to a finished product having a combination of characteristics approximating those of the finished stock prepared pursuant to the specific examples of procedure hereinbefore given.

I have hereinbefore indicated that the raw sawdust is preferably classified before it undergoes the chemical processing hereinbefore described. In the event that the finished stock is to be used as a filler in papers, molded plastics, or other products wherein very fine particle size cellulose of a purified, substantially stable character is desired, the raw sawdust is preferably screened to produce a fraction of a particle size finer than about 100 mesh, which very fine fraction may then be put through the chemical processing hereinbefore described so as to yield a finished product of the desired fine particle size. Such fine particle size cellulose is also admirably adapted for conversion into cellulose xanthate solutions by the one-step xanthating operation disclosed in my application Serial No. 679,585, filed July 8, 1933. The coarse fraction recovered from screening may also be processed as hereinbefore described to yield a finished product having spheres of usefulness wherein finer than 100-mesh cellulose is not a requisite, for instance, a product well adapted for conversion into cellulose xanthate, cellulose nitrate, and cellulose acetate by conventional processes.

It is possible to produce the product of the present invention by using as raw material comminuted wood or raw wood fiber fragments in form other than sawdust, for instance, groundwood prepared by abrading or shearing the fibers from a block or log of wood in the manner practiced when groundwood pulp is being produced for newsprint paper. In such latter case, the block or log of wood is usually brought under heavy pressure into contact with grinding rolls which forcibly tear or shear fiber fragments from the encrusted mass of fibers constituting the raw wood. As in the case of sawdust, the groundwood is preferably initially screened to exclude coarse wood particles and more particularly particles of a size greater than 10-mesh.

The solution usually employed as a standard for measuring the viscosity of cellulose pulp is a cuprammonium cellulose solution of prescribed cellulose concentration, the viscosity being determined by measuring the time of efflux of a definite volume of such solution under standard conditions, through an orifice of standard size. The solution viscosity of fiber is hereinbefore given in absolute C. G. S. units or poises, and is determined by measuring the viscosity of a solution of 6 grams of fiber in a cuprammonium solution composed of 225 cc. of 28% ammonia water containing 9 grams of cuprous oxide or so-called "copper hydrate" powder. Such "copper hydrate" powder is in reality basic copper nitrate corresponding in composition to the formula $$Cu(NO_3)_2 \cdot 3Cu(OH)_2.$$

The C. G. S. unit is employed because it is definite, denoting a viscosity 100 times that of water at 20° C., wherefore, a cuprammonium cellulose solution of standard composition identifying a fiber as having a solution viscosity of 10 is 1000 times as viscous as water at 20° C. The method of measuring or determining solution viscosity of cellulose fiber used herein is that described by me in much greater detail in "Industrial and Engineering Chemistry", volume 23, page 136, 1931; and inasmuch as the description of my viscosity-testing method as given in that publication affords the particular criterion or test used herein, it is to be understood that my reference to such description is intended to incorporate such description as part hereof.

I claim:—

1. A fractured wood fiber product derived from raw wood particles or fragments of an average particle size finer than about 10-mesh, said product consisting of substantially individualized fiber fragments, being substantially free from the ligneous, resinous, and other impurities associated with the raw wood, and having a solution viscosity not greater than 2 C. G. S. units.

2. A paper comprising wood fiber fragments derived from raw wood particles or fragments of an average particle size finer than about 10-mesh, said fiber fragments being substantially free from the ligneous, resinous, and other impurities associated with the raw wood, and having a solution viscosity not greater than 2 C. G. S. units.

3. A fractured wood fiber product of a particle size finer than 100-mesh derived from raw wood sawdust of similar particle size, said product being substantially free from the ligneous, resinous, and other impurities associated with the raw wood and consisting of substantially individualized fiber fragments originally bound up as sawdust particles.

4. A fractured wood fiber product of a particle size finer than 100-mesh derived from raw wood sawdust of similar particle size, said product being substantially free from the ligneous, resinous, and other impurities associated with the raw wood, consisting of substantially individualized fiber fragments originally bound up as sawdust particles, and having a solution viscosity not greater than 2 C. G. S. units.

GEORGE A. RICHTER.